June 20, 1967 HANS-JOACHIM HELD 3,327,293

COMPUTER

Filed Aug. 26, 1963

INVENTOR

Hans-Joachim Held

BY Spencer & Kaye

ATTORNEYS 3,327,293

COMPUTER

Hans-Joachim Held, Litzelstetten, Germany, assignor to Telefunken Patentverwertungs-G.m.b.H., Ulm (Danube), Germany Filed Aug. 26, 1963, Ser. No. 304,797
Claims priority, application Germany, Aug. 25, 1962, T 22,649
10 Claims. (Cl. 340—172.5)

The present invention relates to an electronic synchronous computer which incorporates at least a program control section, a main processing unit, and a main storage unit. The latter is able to give out data from addressable cells and to receive data intended for such cells. In the course of the operation of the computer, data is constantly being transferred between the main storage unit and the main processing unit as well as between the main storage unit and the program control section. At the start of a longer computation, operands are fed into the computer by means of so-called peripheral units, while at the end of the operation the results of the computation are fed by the computer proper into such peripheral units. These peripheral units, also known as input-out devices, may, for input purposes, be constituted by units which can function solely as input devices, such as card or paper tape readers, and, for output purposes, by units which can function solely as output devices, such as card or paper tape punches of indicating devices such as cathode ray tubes, or they may be constituted by devices which can function either as an input device or as an output device, such as a magnetic tape unit, or a typewriter-like printer. Due to the fact that these peripheral units can handle data only at relatively slow speeds, the computer per se is not fully utilized, and it is therefore expedient to increase the efficiency of the system by using the computer for solving further problems while the data is being transferred to or from the peripheral units. The main storage unit must then properly coordinate and process two flows of data, namely, the slow flow of data to and from the peripheral unit or units, and the high-speed flow of data which takes place within the computer during internal computation.

The present invention relates to coordinating this slow and fast data handling.

It is known to arrange computing programs which do not involve the use of peripheral units and which are therefore called internal programs in such a manner that they can be interrupted at given time intervals. The peripheral units are then examined to see whether, during such interruptions, they are ready to be read-out or to have data fed thereinto, whereupon the peripheral units are handled one after the other. These points of interruption have the characteristic that the contents of the registers which are needed in any way for handling the peripheral units is, at this instant, irrelevant insofar as the internal program is concerned.

Also known are so-called micro-programmed computer systems which, due to the fact that they offer more opportunities for interruptions, are better suited for handling a large number of peripheral units than the already described computer system. Here, the points of interruption are arranged in the individual commands which then run off as microprograms. In this way, many interruptions per command are obtained, thereby facilitating the work of the programmer.

It is also known to monitor the handling of the peripheral units by means of the program control section. This is done by storing the command code of the operating step of an internal program which immediately follows a point of interruption, and in place of such command code, applying to a command register the command code of a peripheral transport step. After the peripheral unit has been taken care of, the stored command code of the internal program is called back, whereupon the internal program continues to run from the proper point. According to the present invention, the time interval between two points of interruption is shortened so as to be no longer than the time of a single clock pulse of the master clock, so that a command of "ready," i.e., a command signal by a peripheral unit indicating that such unit is ready to be read-out or to receive data, can be considered during each clock pulse. This feature is particularly desirable in the case of so-called real-time computers which are at all times ready to receive and to process data.

A further advantage of the present invention is that the arrangement can be reduced to practice very easily and in such a manner that the various component parts are neatly grouped. This is of significance especially for large and complex computer installations, as well as if additional peripheral units are to be connected with already existing computer installations.

In essence, the present invention resides in the following: The main storage unit is controlled via a clock pulse line which delivers clock pulses without interruption, while the other components of the computer are connected to a clock pulse line which can be turned off. When a peripheral unit gives the command "ready," this last-mentioned clock pulse line is blocked by such unit so that the previous conditions of the main computer unit and the program control section are preserved until the peripheral unit which issued the "ready" command has been answered, that is to say, until such unit has been taken care of either by reading-out data contained therein or writing-in the data which the peripheral unit is ready to receive.

Additional objects and advantages of the present invention will become apparent upon consideration of the following description when taken in conjunction with the accompanying drawings in which.

Figure 1:
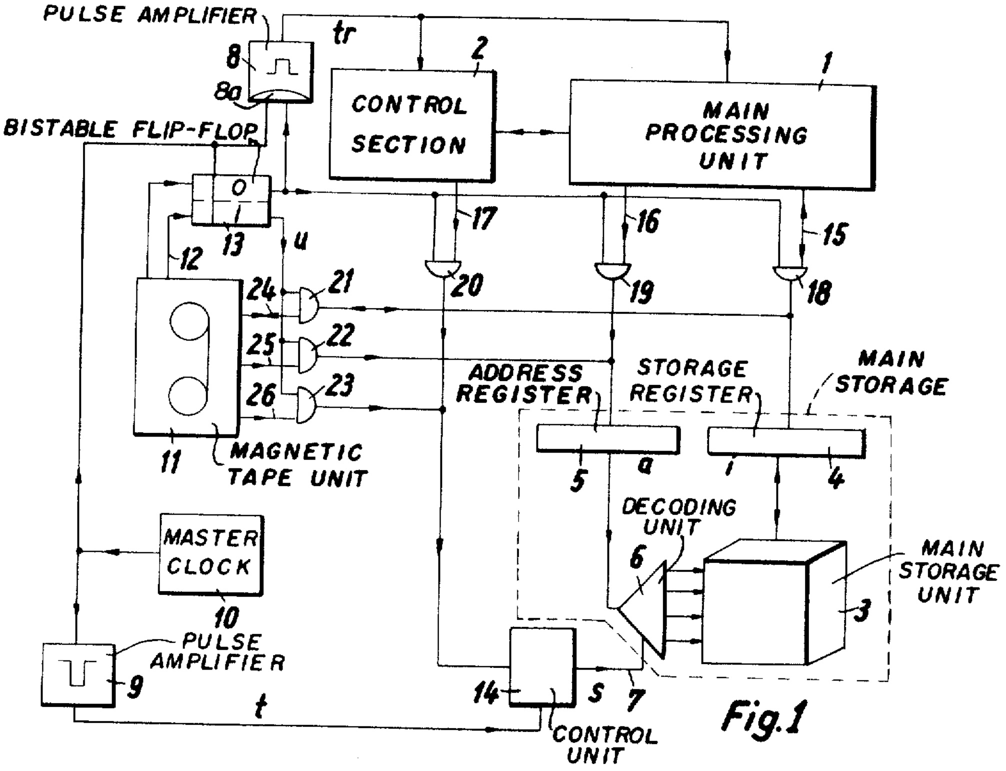
FIGURE 1 is a block diagram of a computer arrangement according to the present invention, including a peripheral unit shown here as a magnetic tape unit.

Referring now to the drawing and to FIGURE 1 thereof in particular, the same shows a computer arrangement incorporating a main processing unit 1, a program control section 2, and a main storage unit 3. These components can have any and all of the conventional characteristics relating to computer components. A storage register 4 is connected to the main storage unit 3, this register receiving data from and giving data to the main storage unit 3.

The main storage unit 3 is addressable, the address appearing in an address register 5 for at least as long as the main storage unit 3 operates. As is conventional, a decoding unit 6 is connected to the output of the address register for decoding the address which is usually coded in binary form. The decoding unit activates the proper cell of the main storage unit 3, the parts 3, 4, 5, 6, thus collectively constituting a main storage. One storage cell can contain either a single binary symbol or a group of binary symbols, so-called "word." The main storage unit is activated via control lines 7, a differentiation being made between "erase," "write," and "read."

The computer arrangement with which the present invention is concerned is a synchronous computer, i.e., a calculating device in which the performance of all operations is controlled with periodic signals or pulses generated by a so-called master clock 10. The system includes clock pulse amplifiers 8 and 9, which may also be used to impart the desired shape to the pulses put out by the clock. The outputs of amplifiers 8 and 9 are, as shown in FIGURE 1, connected to the various components of the computer.

The parts described so far are connected to a suitable peripheral unit, this term being intended to encompass any appropriate input (or output) device such as a magnetic tape unit 11. This magnetic tape unit will hereinafter be considered as representing any other suitable input (or output) device, or any suitable combination of input devices which feed data to the computer (or output devices which receive data). For the sake of facilitating the description of the arrangement, the unit 11 will be considered as serving as an input device which, when it is read-out, will supply data to the computer, it being understood, however, that, by appropriate changes as will be described below, the unit 11 can serve as an output device which receives data from the computer.

The unit 11 is provided with a signal output 12 which is energized when the unit is to be read-out. A command to that effect—which will hereinafter be referred to as a "ready" command—appears when, in the course of a block transfer from the tape unit to the main storage unit, a buffer register pertaining to the magnetic tape unit has been filled and is to have its contents transferred to the main storage unit before new data coming from the magnetic tape unit are to be written into the buffer register. An internal program which is being carried out within the computer at this time must then be interrupted.

This interruption is, according to the present invention, accomplished as follows: The clock pulse amplifier 8, which alone supplies the control section and the main processing unit, is blocked so that the conditions of the control section and the main processing unit prevailing at that instant will, in a manner of speaking, be frozen. In the illustrated circuit, the clock pulse amplifier 8 is blocked by one of the two complementary outputs—here, the zero-output—of a bistable flip-flop element 13$^x$ which is triggered by the signal coming from signal output 12. This signal coming from the zero-output is applied to one input of an AND-circuit 8*a* whose other input is connected to the output of the master clock 10. As soon as the bistable element 13 is flipped to zero, the logic value "one" will no longer appear at the right-hand input of AND-circuit 8*a* so that the amplifier 8 will no longer apply any clock pulses *tr* to the control section 2 and the main processing unit 1. Clock pulses will, however, continue to be passed on by the other amplifier 9$^x$ which is synchronized by the master clock pulses and which is not under the control of any logic circuit, so that clock pulses *t* will continue to reach the main storage unit 3 so that the same will still continue to function.

In order to make the main storage unit 3 independent of the frozen program control section 2, this unit 3 is provided with its own simple control section 14 which combines the three possible operations (erase, read, write) which will then run off in a manner to be described below.

In practice, freezing certain portions of the computer by shutting off the flow of clock pulses is not yet sufficient in order to accomplish the desired result inasmuch as the operating outputs of these parts of the computer have to be deactivated so that they no longer act on the main storage unit 3. What is involved is the data transmission path 15 between the main processing unit and the storage register 4 and the address transmission path 16 between the main processing unit (or another unit) and the address register 5 of the storage means. Finally, the operating outputs 17 of the program control section 2 have to be separated from the main storage unit 3. All of this is also accomplished by means of the already mentioned bistable element 13, whose zero-output is connected to one input of each of gates 18, 19 and 20, which are connected in the respective transmission paths. Each of the gates represents as many actual gates as there are binary transmission lines in each of the paths 15, 16, 17, i.e., if, for example, the transmission path 15 incorporates twenty binary lines, there will be twenty gates 18 each having one input connected to the zero-output of the bistable element 13. All of these gates, then, are closed when the magnetic tape unit 11 issues a "ready" command indicating that it is ready to be read-out and thereby cuts off the flow of clock pulses to unit 1 and section 2.

The system further comprises gates 21, 22 and 23, interposed, respectively, in the data channel 24 between the unit 11 and the storage register 4, in the address channels 25 between the unit 11 and the address register 5, and in the control lines 26 between the unit 11 and the control unit 14 of the main storage unit 3. One input of each of gates 21, 22, 23, is connected to the appropriate output of unit 11 while the other input of each of these gates is connected to the one-output of the bistable element 13, so that each of gates 21, 22, 23, is opened, while each of gates 18, 19, 20, is closed.

The gates 18 and 21 which are provided in the data transmission path to the storage register 4, are so arranged that data can flow in either direction, depending on the program, while the other gates are effective in one direction only.

Figure 2:
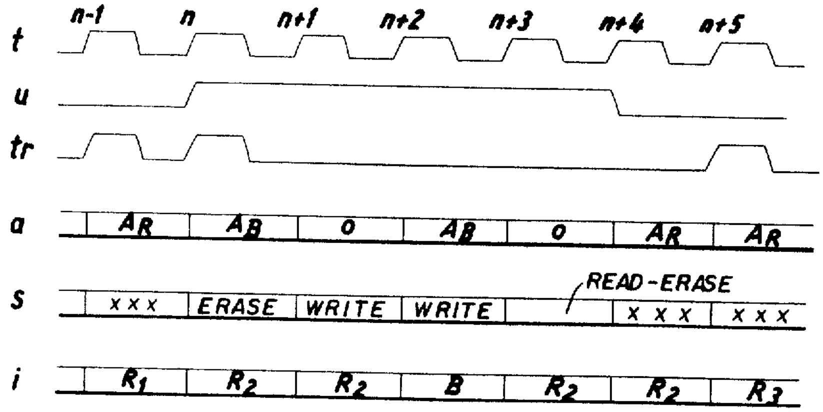
FIGURE 2 is a multiple time plot showing the operation of the computer arrangement of FIGURE 1.

The operation of the circuit shown in FIGURE 1 is illustrated in FIGURE 2.

The first line shows a train of clock pulses *t* which are delivered by the master clock 10 and, after proper shaping and amplification, by the amplifier 9. In order to facilitate the following analysis, the pulses are identified as $n-1$, $n$, $n+1$, $n+2$, $n+3$, $n+4$, and $n+5$.

Let it be assumed that shortly before the clock pulse $n$, a "ready" signal appears at the output 12 of unit 11, to indicate that the unit wishes to be read-out. This causes the clock pulse $n$ to flip the bistable element 13 from its original state "zero" to state "one," the signal at the one-put $u$ of element 13 being shown in the second line of FIGURE 2. The zero-output of element 13 causes the train of clock pulses *tr* applied to the control section 2 and the main processing unit 1 to be interrupted, this interruption starting with pulse $n+1$ since pulse $n$ itself is still applied to components 1 and 2. The pulse train *tr* is shown in the third line of FIGURE 2.

The computer thus operates normally until the occurrence of clock pulse $n$. The condition of the main processing unit 1 and that of the control section 2 can, however, due to the closing of the gates 18, 19, 20, no longer have any effect on the main storage unit 3. Instead, the gates 21, 22, 23, are now open.

The fourth line of FIGURE 2 shows the contents $a$ of the address register 5 as a function of time. While during clock pulse $n-1$, the address of the interrupted internal program still appeared in the address register, it will be an address $A_B$ from the unit 11 which, during clock pulse $n$, is transferred to the address register. The fifth and sixth lines show, respectively, the output $s$ of the control unit 14 and the contents $i$ of the storage register 4. During clock pulse $n-1$, while the main storage unit 3 still had available for processing an internal program address and data $R_1$ of the main processing unit, there was still applied a perfectly normal storage operation controlled by the internal program control section 2. During clock pulse $n$, the storage register 4 possibly still contains internal data supplied during the prior clock pulse. As already described, the address register already contains the first address from the unit 11. The storage operation which runs off during clock pulse $n$ is determined by the control line "erase," so that after this clock pulse, the storage cell to be fed by the unit 11 is erased.

During clock pulse $n+1$, the contents of the storage register 4, which, as before, consists of internal data $R_2$, is deposited into a special storage cell of unit 3 and is thus preserved. This storage cell preferably has the number zero—and hence an address which is easily obtained electronically—and is, in fact, obtained electronically in that, for this clock pulse, the gate 19 between the main processing unit 1 and the address register 5 as well as the gate 22 between the unit 11 and the address register are closed. During this time, the control lines command "write." During the next clock pulse $n+2$, the information B from the tape of unit 11 is written into the address $A_B$, or, in the case of read-out, the contents of a given main storage unit cell is read-out into the storage register. Finally, the clock pulse $n+3$ brings the internal data preserved in the cell zero back into the storage register.

The control unit 14 synchronizes and interprets the control signals derived via line 26 from the magnetic tape unit 11. It produces control signals which cause the main storage operations in a manner described above according to line *s* of FIG. 2.

If neither unit 11 nor any other peripheral unit associated with the system generates a "ready" command at this time, the unit 11 erases the bistable element 13, i.e., causes the same to flip back to its original state, so that the computer system is brought back into the condition in which it was prior to the interruption, whereupon the computer can proceed with its internal program.

The above explanations apply equally to a "ready" command to the effect that information be given out from the computer. In that case, the cell $A_B$ will not be erased, and the write-in into the cell $A_B$ becomes an output operation, i.e., a read-out.

It will be understood that the above description of the present invention is susceptible to various modifications, changes, and adaptations, and the same are intended to be comprehended within the meaning and range of equivalents of the appended claims. For instance, the control unit 14 of the main storage unit 3 becomes substantially simpler if the computer with which the present invention is used is one which can, during each clock pulse, carry out a complete storage cycle, complete with read-out, transfer between the storage register and a desired calculating register, erasing, and a new writing-in. In such case, the contents of the storage register 4 after each pulse becomes irrelevant so that it is not necessary to preserve its contents in a special cell, as was described above.

The present invention can also be applied when a plurality of peripheral units are involved, as, for example, in systems adapted for making flight or hotel reservations, for banking operations, and the like, in each of which a large number of stations act on a central computer. Such a system may, in practice, include a central control section which determines the priority of the various peripheral units, which control section interrogates each peripheral unit and switches the appropriate one through by offering the correct address to the computer and activating the bistable element 13.

Should several "ready" commands directly follow each other, the temporarily stored internal data will not be retrieved until such time as there is no such command. In this way, the computer is always fully utilized inasmuch as an internal program, or a part thereof, is handled during all time intervals between "ready" commands, without it being necessary for the programmer to take such intermittent operation into consideration.

What is claimed is:

1. A synchronized computer arrangement comprising, in combination:

(a) a main processing unit;
(b) a program control section for controlling said main processing unit;
(c) a main storage unit coacting with said processing unit and said control section;
(d) a peripheral unit which, when the same issues a "ready" command, is to be connected to said main storage unit;
(e) a master clock for delivering clock pulses for controlling, in synchronism, the action of said main processing unit, said program control section and said main storage unit;
(f) non-interruptible transmission means for supplying clock pulses from said master clock to said main storage unit;
(g) interruptible transmission means for supplying clock pulses from said master clock to said main processing unit and to said control section; and
(h) further control means responsive to a "ready" command issued by said peripheral unit for thereupon interrupting said interruptible clock pulse transmission means, thereby to preserve the condition of said main processing unit and said control section.

2. A synchronized computer arrangement comprising, in combination:

(a) a main processing unit;
(b) a program control section for controlling said main processing unit;
(c) a main storage incorporating
  (1) a main storage unit coacting with said main processing unit and said control section,
  (2) a storage register connected to said main storage unit, and
  (3) an address register connected to said main storage unit;
(d) a master clock;
(e) non-interruptible transmission means for supplying clock pulses from said master clock to said main storage unit;
(f) interruptible transmission means for supplying clock pulses from said master clock to said main processing unit and to said control section;
(g) a peripheral unit which, when the same issues a "ready" command, is to be answered;
(h) means responsive to a "ready" command issued by said peripheral unit for thereupon interrupting said interruptible clock pulse transmission means, thereby to preserve the condition of said main processing unit and said control section; and
(i) additional control means associated with said main storage for automatically, upon the occurrence of a "ready" command, applying the contents of said storage register to a cell of said main storage unit, and for re-establishing the interrupted clock pulse transmission means after, subsequent to the answering of the peripheral unit, the contents of said cell has been re-introduced into said storage register.

3. A computer arrangement as defined in claim 2 wherein the address of said cell is formed by blocked gate means interposed between said peripheral unit and said address register.

4. A computer arrangement as defined in claim 2 wherein the address of said cell is formed by blocked gate means interposed between said peripheral unit and said address register and by blocked gate means interposed between said main processing unit and said main storage.

5. A synchronized computer arrangement comprising, in combination:

(a) a main processing unit;
(b) a program control section for controlling said main processing unit;
(c) a main storage incorporating
  (1) a main storage unit coacting with said main processing unit,
  (2) a storage register connected to said main storage unit, and
  (3) an address register connected to said main storage unit;
(d) a master clock;
(e) non-interruptible transmission means for supplying clocking pulses from said master clock to said main storage unit;
(f) interruptible transmission means for supplying clock pulses from said master clock to said main processing unit and to said control section;
(g) a peripheral unit which, when the same issues a "ready" command, is to be answered;
(h) means responsive to a "ready" command issued by said peripheral unit for thereupon interrupting said interruptible clock pulse transmission means, thereby to preserve the condition of said main processing unit and said control section;

(i) first gate means interconnecting said main processing unit and said storage register;

(j) second gate means interconnecting said main processing unit and said address register;

(k) third gate means interconnecting said control section and said main storage unit;

(l) fourth gate means interconnecting said peripheral unit and said storage register;

(m) fifth gate means interconnecting said peripheral unit and said address register; and (n) sixth gate means interconnecting said peripheral unit and said main storage unit;

(o) said first, second and third gate means being connected to the output of said means (h) for being closed by the latter upon the occurrence of a "ready" command and said fourth, fifth and sixth gate means being connected to said means (h) for being opened by the latter upon such occurrence.

6. A computer arrangement as defined in claim 5 wherein said means (h) comprises a bistable flip-flop circuit having input means connected to said peripheral unit and two complementary outputs one of which is activated upon the occurrence of a "ready" command from said peripheral unit, said one output being connected to an input of each of said first, second and third gate means and the other output of said flip-flop circuit being connected to an input of each of said fourth, fifth and sixth gate means.

7. A computer arrangement as defined in claim 6 wherein said interruptible clock pulse transmission means includes a gate one of whose inputs is connected to the output of said master clock and the other of whose inputs is connected to said one output of said flip-flop circuit.

8. A computer arrangement as defined in claim 7 wherein said main storage further includes a decoding unit interposed between said address register and said main storage unit.

9. A computer arrangement as defined in claim 8, further comprising an additional control unit incorporated in said non-interruptible transmission means and being connected to said decoding unit as well as to the output of said third and sixth gate means.

10. A computer arrangement comprising, in combination:

(A) a main processing unit;

(B) a control section connected to said main processing unit;

(C) a main storage incorporating (1) a main storage unit (2) a storage register connected to said main storage unit, (3) an address register, and (4) a decoding unit interposed between said address register and said main storage unit;

(D) a control unit having its output connected to the input of said decoding unit;

(E) a master clock;

(F) a first pulse amplifier having its input connected to the output of said master clock and its output connected to the input of said control unit;

(G) a gate circuit having one input connected to the output of said master clock;

(H) a second pulse amplifier having its input connected to the output of said gate circuit and its output connected to said control section and to said main processing unit;

(I) a peripheral unit having a "ready" command output means;

(J) a bistable flip-flop circuit having two complementary outputs one of which is activated upon the occurrence of a "ready" command from said peripheral unit, said one output being connected to the other input of said gate circuit;

(K) first gate means having one input connected to an output of said main processing unit and another input connected to said one output of said flip-flop circuit, the output of said first gate means being connected to said storage register;

(L) second gate means having one input connected to an output of said main processing unit and another input connected to said one output of said flip-flop circuit, the output of said second gate means being connected to said address register;

(M) third gate means having one input connected to an output of said control section and another input connected to said one output of said flip-flop circuit, the output of said third gate means being connected to said control unit;

(N) fourth gate means having one input connected to an output of said peripheral unit and another input connected to the other output of said flip-flop circuit, the output of said fourth gate means being connected to said storage register;

(O) fifth gate means having one input connected to an output of said peripheral unit and another input connected to said other output of said flip-flop circuit, the output of said fifth gate means being connected to said address register; and (P) sixth gate means having one input connected to an output of said peripheral unit and another input connected to said other output of said flip-flop circuit, the output of said sixth gate means being connected to said control unit.

References Cited

UNITED STATES PATENTS

| | | | |
|---|---|---|---|
| 3,221,309 | 11/1965 | Benghiat | 340—172.5 |
| 3,226,694 | 12/1965 | Wise | 340—172.5 |

ROBERT C. BAILEY, *Primary Examiner.*

P. L. BERGER, P. J. HENON, *Assistant Examiners.*